(12) United States Patent
Dautreppe et al.

(10) Patent No.: US 12,163,475 B2
(45) Date of Patent: Dec. 10, 2024

(54) HYDRAULIC EQUIPMENT PLATE FOR AERONAUTICAL TURBOMACHINE

(71) Applicant: SAFRAN AIRCRAFT ENGINES, Paris (FR)

(72) Inventors: Frédéric Dautreppe, Moissy-Cramayel (FR); Bertrand Romain Adrien Dufour, Moissy-Cramayel (FR); Romain Harold Patrice Pou, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 95 days.

(21) Appl. No.: 17/757,263

(22) PCT Filed: Dec. 3, 2020

(86) PCT No.: PCT/FR2020/052268
§ 371 (c)(1),
(2) Date: Jun. 13, 2022

(87) PCT Pub. No.: WO2021/116570
PCT Pub. Date: Jun. 17, 2021

(65) Prior Publication Data
US 2023/0003235 A1 Jan. 5, 2023

(30) Foreign Application Priority Data
Dec. 13, 2019 (FR) ........................ 1914407

(51) Int. Cl.
*F02C 7/32* (2006.01)
*F16H 57/02* (2012.01)
*F15B 15/20* (2006.01)

(52) U.S. Cl.
CPC ................ *F02C 7/32* (2013.01); *F15B 15/20* (2013.01); *F16H 2057/02026* (2013.01)

(58) Field of Classification Search
CPC .. F02C 7/22; F02C 7/222; F02C 7/224; F02C 7/32; F16H 57/025; F16H 57/0421;
(Continued)

(56) References Cited

U.S. PATENT DOCUMENTS

| | | | |
|---|---|---|---|
| 6,237,322 B1 * | 5/2001 | Rago | F02C 7/22 60/39.08 |
| 8,845,898 B2 * | 9/2014 | DeDe | B64D 41/00 210/450 |

(Continued)

FOREIGN PATENT DOCUMENTS

| | | | | |
|---|---|---|---|---|
| EP | 0540192 A1 * | 5/1993 | | F02C 7/32 |
| EP | 2098757 A2 | 9/2009 | | |

(Continued)

OTHER PUBLICATIONS

French Search Report issue in French Application No. 1914407 on Aug. 26, 2020 (2 pages).

(Continued)

*Primary Examiner* — Alain Chau
(74) *Attorney, Agent, or Firm* — Bookoff McAndrews, PLLC

(57) ABSTRACT

Plate of pieces of hydraulic equipment of an aeronautical turbomachine comprising channels for circulation of fluids entering and leaving each of the pieces of hydraulic equipment, on the one hand further comprising a support part of a housing body of each of the pieces of hydraulic equipment intended to receive fastening means to these pieces of hydraulic equipment and on the other hand a housing body part of at least one of these pieces of hydraulic equipment.

9 Claims, 2 Drawing Sheets

(58) Field of Classification Search
CPC ............. F16H 57/0423; F16H 57/0424; F16H 2057/02026
See application file for complete search history.

(56) References Cited

U.S. PATENT DOCUMENTS

| | | | | |
|---|---|---|---|---|
| 10,221,721 | B2* | 3/2019 | Plickys | ............... F15B 13/0885 |
| 10,247,296 | B2* | 4/2019 | van der Merwe | .. F16H 57/0417 |
| 10,502,097 | B2* | 12/2019 | Plickys | ................... F01D 15/12 |
| 10,753,455 | B2* | 8/2020 | van der Merwe | ...... F16H 57/02 |
| 10,767,749 | B2* | 9/2020 | Duong | ................. F16H 57/025 |
| 11,060,599 | B2* | 7/2021 | Duong | ................. F16H 57/033 |
| 2009/0165464 | A1* | 7/2009 | Gotz | ........................ F02C 7/32 60/802 |
| 2012/0006151 | A1* | 1/2012 | DeDe | ........................ F02C 7/32 210/450 |
| 2012/0117982 | A1 | 5/2012 | Suciu et al. | |
| 2014/0130628 | A1* | 5/2014 | Abousleiman | ........ F01D 25/162 74/412 R |
| 2016/0201789 | A1* | 7/2016 | Duong | ................. F16H 57/025 74/606 R |
| 2016/0369653 | A1* | 12/2016 | Plickys | ............... F15B 13/0871 |
| 2018/0163845 | A1* | 6/2018 | van der Merwe | ........ F02C 7/14 |
| 2019/0112984 | A1* | 4/2019 | Alstad | ..................... F16H 55/20 |
| 2019/0162078 | A1* | 5/2019 | Plickys | ............... F15B 13/0814 |
| 2019/0170239 | A1* | 6/2019 | van der Merwe | ....... F01D 25/12 |
| 2019/0219041 | A1* | 7/2019 | Hochstetler | ............... F04B 1/20 |
| 2020/0362953 | A1* | 11/2020 | Duong | ................. F16H 57/025 |

FOREIGN PATENT DOCUMENTS

| | | | |
|---|---|---|---|
| FR | 2981986 A1 | 5/2013 | |
| FR | 3017660 A1 * | 8/2015 | ............... F02C 7/32 |
| GB | 2615315 A * | 8/2023 | ............... B64D 33/08 |
| WO | WO-9420739 A2 * | 9/1994 | ............. F01D 25/20 |
| WO | 2010086422 A1 | 8/2010 | |
| WO | 2013001238 A1 | 1/2013 | |

OTHER PUBLICATIONS

International Search Report and Written Opinion issued in International Application PCT/FR2020/052268 on Mar. 16, 2021 (12 pages).

* cited by examiner

[Fig. 1]
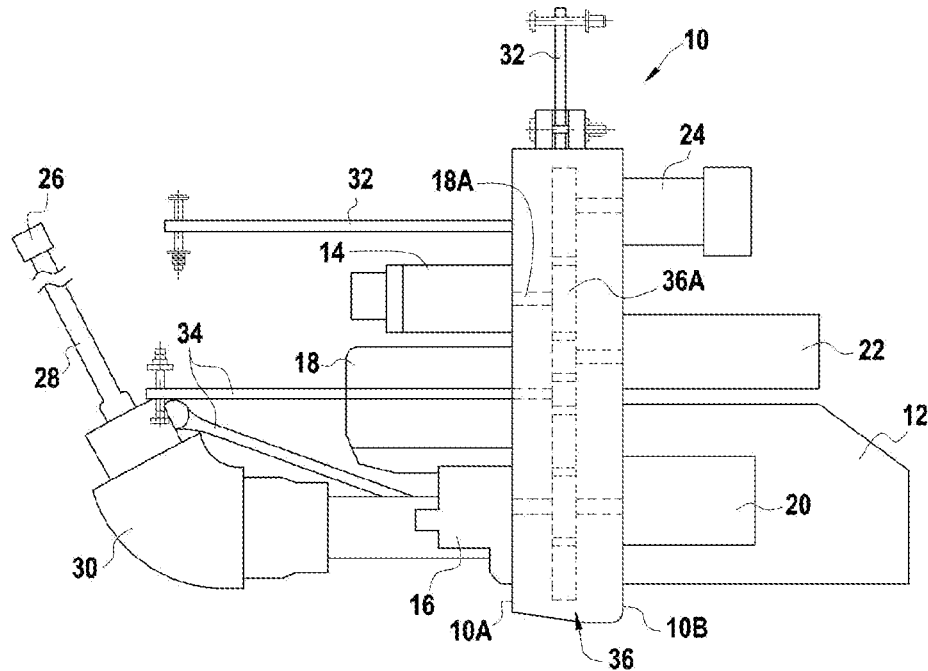
[Fig. 2]
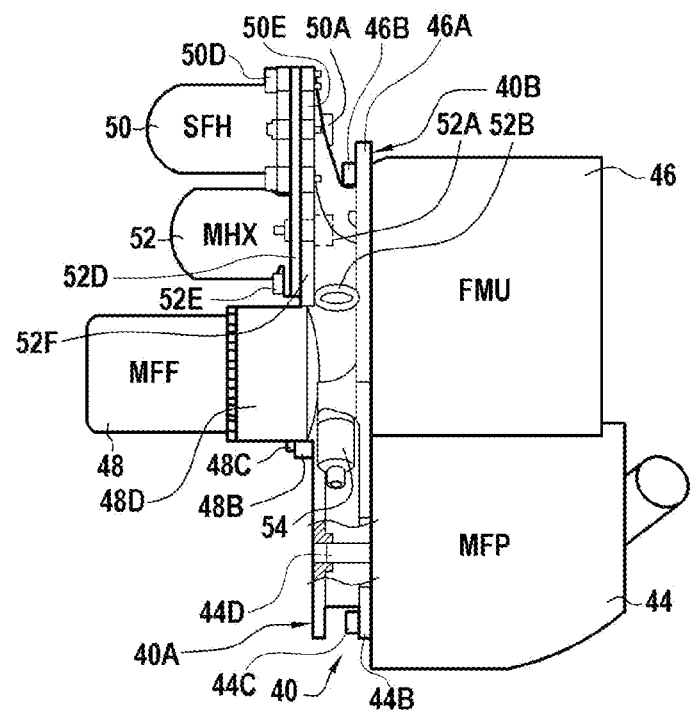

[Fig. 3]
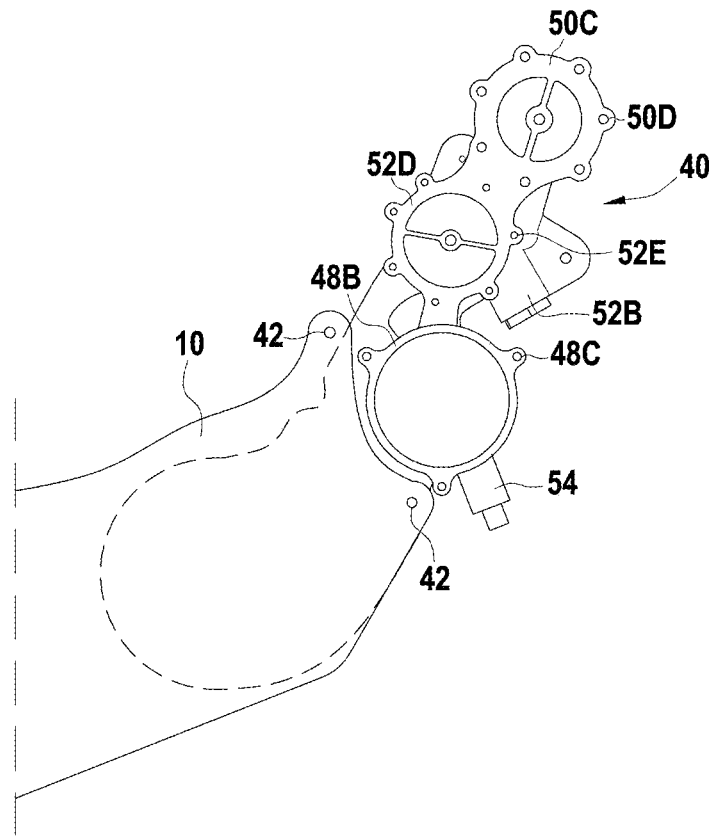
[Fig. 4]
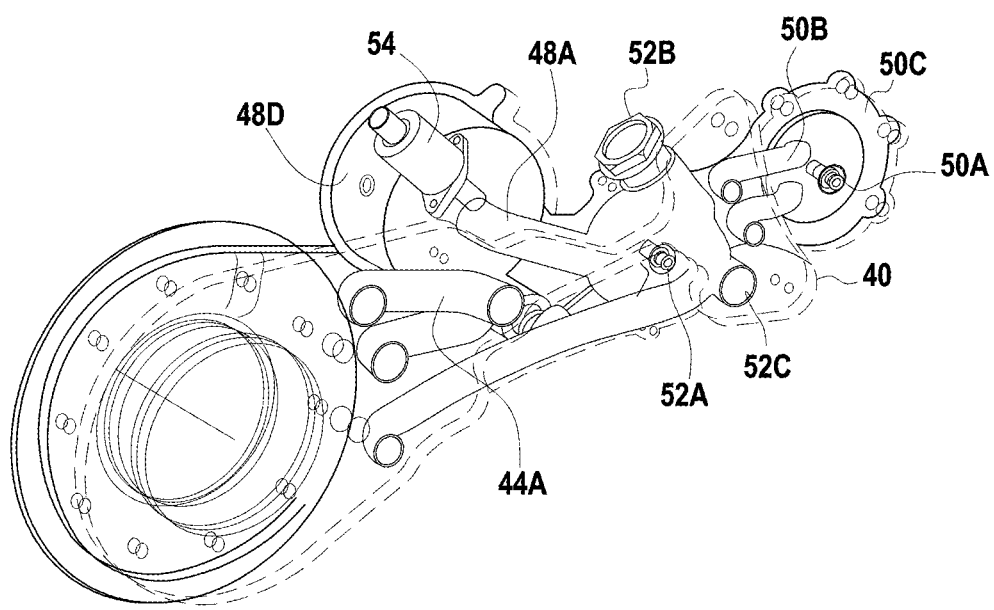

HYDRAULIC EQUIPMENT PLATE FOR AERONAUTICAL TURBOMACHINE

CROSS-REFERENCE TO RELATED APPLICATIONS

This application is a National Stage Application of International Application PCT/FR2020/052268, filed on Dec. 3, 2020, now published as WO 2021/116570 A1, and which claims priority to French Patent Application No. 1914407, filed on Dec. 13, 2019.

TECHNICAL FIELD

The present invention relates to the general field of mounting on an aeronautical turbomachine, in particular a turbojet, the housing for driving accessories and associated pieces of hydraulic equipment, and it relates more particularly to a plate of pieces of equipment fixed to an accessory gearbox to form an accessories system.

PRIOR ART

In a turbojet, accessories such as pumps for production of hydraulic power, fuel supply and lubrication, electric generators for production of electric power, etc. are combined within a housing for driving (or relay) of accessories commonly called AGB (for 'Accessory GearBox') which is further enclosed by different pieces of equipment necessary for supply and servo-control of fuel or oil of the turbomachine but without mechanical link with the AGB. Such an accessory gearbox generally comprises one or more of the gear trains which are driven in rotation by power drawdown on a shaft of the turbojet and to which the different accessories are coupled.

These accessory gearboxes are generally mounted in the zone of the fan compartment of the turbojet. More precisely they are suspended on flanges formed on the metal housing for holding this fan compartment.

Furthermore, optimising the aerodynamic drag of the nacelle to limit the frontal surface of the nacelle means positioning pieces of equipment no longer in the nacelle (fan compartment) but in the so-called 'core' compartment of the turbojet (see for example application FR2981986 in the name of the applicant), that is, an inter-channel compartment which separates the primary flow channel from the secondary flow channel of a dual-flow turbojet.

However, installation of all the pieces of equipment which have or do not have parts driven in rotation by the accessory gearbox raises another problem of the bulk of these pieces of equipment around this housing. This is the case in particular of pieces of fuel equipment, that is, those pieces of equipment which are typically assigned to the fuel circuit of the turbojet.

SUMMARY OF THE INVENTION

The main aim of the present invention is therefore to eliminate such a disadvantage by proposing a plate of pieces of hydraulic equipment which produces reduced bulk in the central compartment of the turbojet and therefore equally reduced weight for all these pieces of equipment. Another aim of the invention is to propose an accessories system incorporating an accessory drive gearbox which has fewer pieces relative to current solutions and therefore has a lower cost.

This aim is achieved by way of a plate of pieces of hydraulic equipment of an aeronautical turbomachine comprising channels for circulation of fluid entering and leaving each of said pieces of hydraulic equipment, characterised in that on the one hand it further comprises a support part of a housing body of each of said pieces of hydraulic equipment intended to receive fastening means to said pieces of hydraulic equipment and on the other hand a housing body part of at least one of said pieces of hydraulic equipment.

According to an advantageous embodiment, the plate of pieces of hydraulic equipment intended to be fixed to an accessory drive gearbox, further comprises a part intended to be offset with respect to the accessory drive gearbox, said offset part of the plate allowing the fastening of pieces of hydraulic equipment on both faces.

Preferably, said pieces of hydraulic equipment are selected from the following pieces of equipment: a main fuel pump, a fuel dispenser, a main fuel filter, a fuel reheater, a main heat exchanger.

When it comprises at least the main fuel filter, the housing body part of said hydraulic equipment is a base part of a bowl intended to receive a filter cartridge of the filter. It can therefore also comprise a differential pressure sensor (Delta/P) of the filter.

When it comprises at least the fuel reheater or the main heat exchanger, the housing body part of said hydraulic equipment is a lower part of the envelope of the reheater or of the exchanger intended to receive an exchange matrix. It can therefore also comprise a relief valve of the reheater or of the exchanger and a by-pass of the main heat exchanger.

When it comprises at least the main fuel pump, the housing body part of said hydraulic equipment is a lower part of the pump body intended to support and guide a drive shaft of the pump.

The invention also relates to a system of accessories comprising a plate of pieces of hydraulic equipment such as described above, and an accessory drive gearbox on which the plate of pieces of hydraulic equipment is advantageously fixed in an offset manner.

BRIEF DESCRIPTION OF THE DRAWINGS

Other characteristics and advantages of the present invention will emerge from the description given hereinabove in reference to the appended drawings which illustrate an embodiment devoid of any limiting character and in which:

FIG. 1 is an external view of an accessory drive gearbox mounted in the central compartment and to which a plate of pieces of equipment according to the invention is fixed, FIG. 2 illustrates an external view of a plate of pieces of equipment according to the invention, FIG. 3 illustrates, without its pieces of equipment, the plate of pieces of equipment of FIG. 2 mounted at the end of the accessory drive gearbox of FIG. 1, and FIG. 4 shows the network of internal channels and the different interfaces of the plate of pieces of equipment of FIG. 2.

DESCRIPTION OF EMBODIMENTS

FIG. 1 shows an accessory drive gearbox 10 mounted in the central compartment (also known as 'core') of a turbojet and capable of integrating a plate of equipment according to the invention. Of course, the field of application of the invention can relate to types of aeronautical turbomachines other than a turbojet.

This type of accessory drive gearbox (or AGB) drives and supports for example, without this list being limiting, one or more electric generators 12, 14, an alternator 16, a lubrication group 18, a starter 20, a de-oiler 22 and other components (a hydraulic pump 24 for example) which constitute the pieces of auxiliary equipment of the engine and power generation of the aircraft. The housing 10 is coupled to the rotor 26 of the turbomachine by means of a radial transmission power shaft 28 via a corner return box 30. The accessory drive gearbox 10 is typically suspended on a casing of the engine (not shown) via suspension links 32, 34.

As is known per se, such a housing comprises one or more gear trains 36 which are each composed of several cogged wheels and which are driven in rotation by the radial transmission power shaft 28 coupled to the rotor 26 of the turbomachine. Each accessory is generally mounted against one of the lateral faces 10A, 10B substantially plane, of the housing 10 and comprises a drive shaft (for example 18A) which is coupled to one of the cogged wheels (for example 36A) of the gear train or gear trains. Apart from this support function for accessories, these lateral faces also ensure a support function for bearing, sealing or lubrication. During operation of the turbomachine, some of the mechanical power generated is withdrawn on the rotor 26 of the turbomachine and transmitted via the radial transmission power shaft 28 and the gear train or the gear trains 36 to the shafts for supplying the different accessories mounted on the housing 10 to drive them in rotation and accordingly actuate the function for which each of the accessories is intended.

According to the invention and as shown in FIGS. 2 to 4, it is intended that the pieces of fuel equipment are mounted on an independent plate 40 having two opposite faces 40A, 40B and one face of which is fixed in part to an end of a lateral face of the accessory drive gearbox 10 by fastening means 42 of bolt type for example, a part of this plate being offset from this accessory drive gearbox and therefore capable of receiving pieces of equipment on both faces (see FIG. 3).

Pieces of equipment fuel mean, without this list being limiting, the main fuel pump 44 (MFP), the fuel metering unit 46 (FMU), the main fuel filter 48 (MFF), the servo fuel heater 50 (SFH), the main heat exchanger 52 (MHX), the differential pressure sensor (Delta/P) of the fuel filter 54 (also called FFDP for 'Fuel Filter Differential Pressure sensor); (it is assumed here that this sensor is independent equipment and not an element of equipment, in this case the filter, in contrast to the relief valve or the by-pass, mentioned then). With the exception of the main fuel pump 44 which must be driven by the accessory drive gearbox 10, the other pieces of equipment as above 46-54 offer the particular feature of not needing such driving and therefore distribution of power from the shaft of the turbomachine 26.

Combining the pieces of equipment fuel on the same plate, attached at an end of the accessory drive gearbox 10, limits the support and the number of channels connecting these pieces of equipment. Furthermore, incorporating some of these pieces of equipment in the plate itself ensures maximal compacting of the installation or a certain gain in mass (for example of the order of 25%) as well as improved mounting/dismounting and maintenance.

FIG. 4 illustrates more particularly the plate 40 integrating all or some of these pieces of equipment in the region of its interfaces with these pieces of equipment.

More precisely, with respect to the fuel dispenser 46, it is evident that, apart from the channels (not shown) for circulation of fluid entering and leaving the dispenser, the plate integrates a support 46A (shown in FIG. 2) of the body of this dispenser intended to receive the fastening means plate/dispenser 46B.

On the contrary, with respect to the main fuel filter 48 it is evident that the plate also incorporates the channels 48A for circulation of fluid entering and leaving for the filter cartridge of the filter and a support 48B of the body of this filter intended to receive the plate/filter fastening means 48C (shown in FIG. 2). The plate further incorporates a part of the body of this filter 48D (shown in FIG. 2), specifically the base of the bowl intended to receive the filter cartridge as well as the sensor delta/P 54. On the one hand this transfer to the plate of the function of the fuel filter, and integration into the plate of the function of the sensor Delta/P, significantly contribute to a gain in mass.

Likewise, with respect to the fuel reheater 50 it is evident, apart from the channels 50B for circulation of fluid entering and leaving the reheater and a support 50C of the body of this reheater intended to receive the plate/reheater, that the plate incorporates fastening means 50D (shown in FIG. 2), a part of the body of this reheater, specifically the lower part of the envelope 50E (shown in FIG. 2) of the reheater intended to receive the exchange matrix of this reheater as well as its relief valve 50A.

With respect to the main heat exchanger 52, it is evident that, apart from the channels 52C for circulation of fluid entering and leaving the exchanger and a support 52D (shown in FIG. 2) of the body of this exchanger intended to receive the plate/exchanger fastening means 52E (shown in FIG. 2), the plate incorporates a part of the body of this exchanger, specifically the lower part of the envelope 52F (shown in FIG. 2) of the exchanger intended to receive its exchange matrix as well as its relief valve 52A and its by-pass 52B.

For the two previous pieces of equipment, on the one hand transfer to the plate of the function of the fuel reheater or of the main heat exchanger, and integration into the plate of the function of the relief valve, significantly contribute to a gain in mass.

Finally, with respect to the main fuel pump 44, it is evident, apart from the channels 44A for circulation of fluid entering and leaving the pump, that the plate 40 incorporates a support 44B (shown in FIG. 2) of the pump body intended to receive the plate/pump fastening means 44C (shown in FIG. 2). It is clear that the drive shaft 44D of the pump (seen in the exploded part of FIG. 2) passes through this plate 40, and that in this way it ensures the centring (support and guiding) of this shaft 44D intended to be connected to a sprocket of the accessory drive gearbox 10.

The invention claimed is:

1. A plate of pieces of hydraulic equipment of an aeronautical turbomachine comprising channels for circulation of fluid entering and leaving each of said pieces of hydraulic equipment, further comprising a support part of a housing body of each of said pieces of hydraulic equipment that is part of the plate and intended to receive fastening means to said pieces of hydraulic equipment, and to receive an enclosure part of a housing body part of at least one of said pieces of hydraulic equipment, wherein the plate of pieces of hydraulic equipment comprises a main portion coupled to an accessory drive gearbox and an offset portion extending from the main portion, wherein the offset portion is offset with respect to the accessory drive gearbox such that the offset portion hangs off from the accessory drive gearbox, and wherein all the pieces of hydraulic equipment are fastened to the offset portion of the plate of pieces of hydraulic equipment.

2. The plate of pieces of hydraulic equipment according to claim 1, wherein said offset part of the plate allowing the fastening of pieces of hydraulic equipment on both faces.

3. The plate of pieces of hydraulic equipment according to claim 1, wherein said pieces of hydraulic equipment comprise at least one of a main fuel pump, a fuel dispenser, a main fuel filter, a fuel reheater, or a main heat exchanger.

4. The plate of pieces of hydraulic equipment according to claim 3, comprising at least the main fuel filter, wherein the housing body part of said hydraulic equipment is a base part of a bowl intended to receive a filter cartridge of the filter.

5. The plate of pieces of hydraulic equipment according to claim 4, further comprising a differential pressure sensor (Delta/P) of the filter.

6. The plate of pieces of hydraulic equipment according to claim 3, comprising at least the fuel reheater or the main heat exchanger.

7. The plate of pieces of hydraulic equipment according to claim 6, further comprising a relief valve of the reheater or of the exchanger.

8. The plate of pieces of hydraulic equipment according to claim 3, comprising at least the main heat exchanger, and a by-pass.

9. The plate of pieces of hydraulic equipment according to claim 3, comprising at least the main fuel pump.

* * * * *